(12) United States Patent
Schmitt (10) Patent No.: US 9,114,365 B2
(45) Date of Patent: Aug. 25, 2015

(54) SHUT OFF VALVE FOR A REVERSE OSMOSIS WATER FILTRATION SYSTEM (75) Inventor: Craig A. Schmitt, Phoenix, AZ (US)

(73) Assignee: Watts Water Technologies, Inc., North Andover, MA (US)

( * ) Notice: Subject to any disclaimer, the term of this patent is extended or adjusted under 35 U.S.C. 154(b) by 566 days.

(21) Appl. No.: 13/122,674

(22) PCT Filed: Oct. 9, 2009

(86) PCT No.: PCT/US2009/060192
§ 371 (c)(1),
(2), (4) Date: Apr. 5, 2011

(87) PCT Pub. No.: WO2010/042836
PCT Pub. Date: Apr. 15, 2010

(65) Prior Publication Data
US 2011/0180464 A1 Jul. 28, 2011

Related U.S. Application Data (60) Provisional application No. 61/195,661, filed on Oct. 9, 2008.

(51) Int. Cl.
B01D 35/157 (2006.01)
F16K 1/00 (2006.01)
B01D 61/10 (2006.01)
B01D 61/08 (2006.01)
C02F 1/44 (2006.01)

(52) U.S. Cl.
CPC ............... *B01D 61/10* (2013.01); *B01D 61/08* (2013.01); *C02F 1/441* (2013.01)

(58) Field of Classification Search
CPC ........ B01D 61/10; B01D 61/08; B01D 61/12; B01D 61/58; B01D 2311/04; B01D 2311/06; B01D 2311/08; B01D 2311/12; B01D 2311/14; B01D 2313/02; B01D 2313/10; B01D 2313/18; B01D 2313/20; B01D 2313/105; B01D 2313/12; B01D 2313/125; B01D 2313/13; B01D 2313/025; B01D 2317/02; B01D 2317/08; B01D 2201/165; C02F 1/441; C02F 2307/06; C02F 2201/0005; C02F 9/005; F16K 31/06; F16K 11/00; F16K 11/02; F16K 11/022
USPC ............... 137/513, 516.11, 527; 210/86, 252, 210/259, 449, 652; 251/324, 331
See application file for complete search history.

(56) References Cited

U.S. PATENT DOCUMENTS 3,761,050 A * 9/1973 Puster .............................. 251/14
4,776,952 A * 10/1988 Burrows ........................ 210/110
(Continued)

FOREIGN PATENT DOCUMENTS

WO 2004/069368 8/2004

OTHER PUBLICATIONS

International Search Report from Application No. PCT/US 09/60192, Mailed Dec. 10, 2009.

*Primary Examiner* — Lore Jarrett
*Assistant Examiner* — Patrick Orme
(74) *Attorney, Agent, or Firm* — Adler Pollock & Sheehan P.C.; George N. Chaclas; Daniel J. Holmander (57) ABSTRACT A shut-off valve for use in a reverse osmosis filtering system including a housing defining an interior in fluid communication with a water inlet, a water outlet, and a permeate inlet, the housing having a fluidic network with a flowpath that connects the water inlet and the water outlet, a diaphragm plate forming a portion of the fluidic network within the interior, a piston within the interior for selectively opening and closing the flowpath, and at least one diaphragm coupling to the piston and the diaphragm plate such that as permeate pressure changes occur at the permeate outlet, the piston rocks between opening and closing the flowpath based on deflection of the at least one diaphragm in response to the permeate pressure changes.

17 Claims, 11 Drawing Sheets

(56) References Cited

U.S. PATENT DOCUMENTS

| | | | |
|---|---|---|---|
| RE35,252 E | * | 5/1996 | Clack et al. .................. 210/251 |
| 6,003,835 A | * | 12/1999 | Moller ......................... 251/61.1 |
| 7,017,611 B2 | * | 3/2006 | Schmitt ........................... 138/43 |
| 2006/0138031 A1 | * | 6/2006 | Kloos et al. .................. 210/96.2 |
| 2007/0095400 A1 | * | 5/2007 | Bergquist et al. ............ 137/485 |

* cited by examiner

SHUT OFF VALVE FOR A REVERSE OSMOSIS WATER FILTRATION SYSTEM

CROSS-REFERENCE TO RELATED APPLICATION

This application is the U.S. national phase, pursuant to 35 U.S.C. §371, of international application No. PCT/US09/060192, published in English on Apr. 15, 2010 as international publication No. WO 2010/042836 A1, which claims the benefit of U.S. Provisional Patent Application No. 61/195,661, filed Oct. 9, 2008, each of which is incorporated herein by reference in their entireties.

TECHNICAL FIELD OF THE DISCLOSURE

The present disclosure relates to a reverse osmosis water filtering system and, more particularly, to a shut-off valve for a reverse osmosis water filtering system that stops supply water from flowing into the system when a storage tank is full of filtered water.

BACKGROUND OF THE DISCLOSURE

Figure 1:
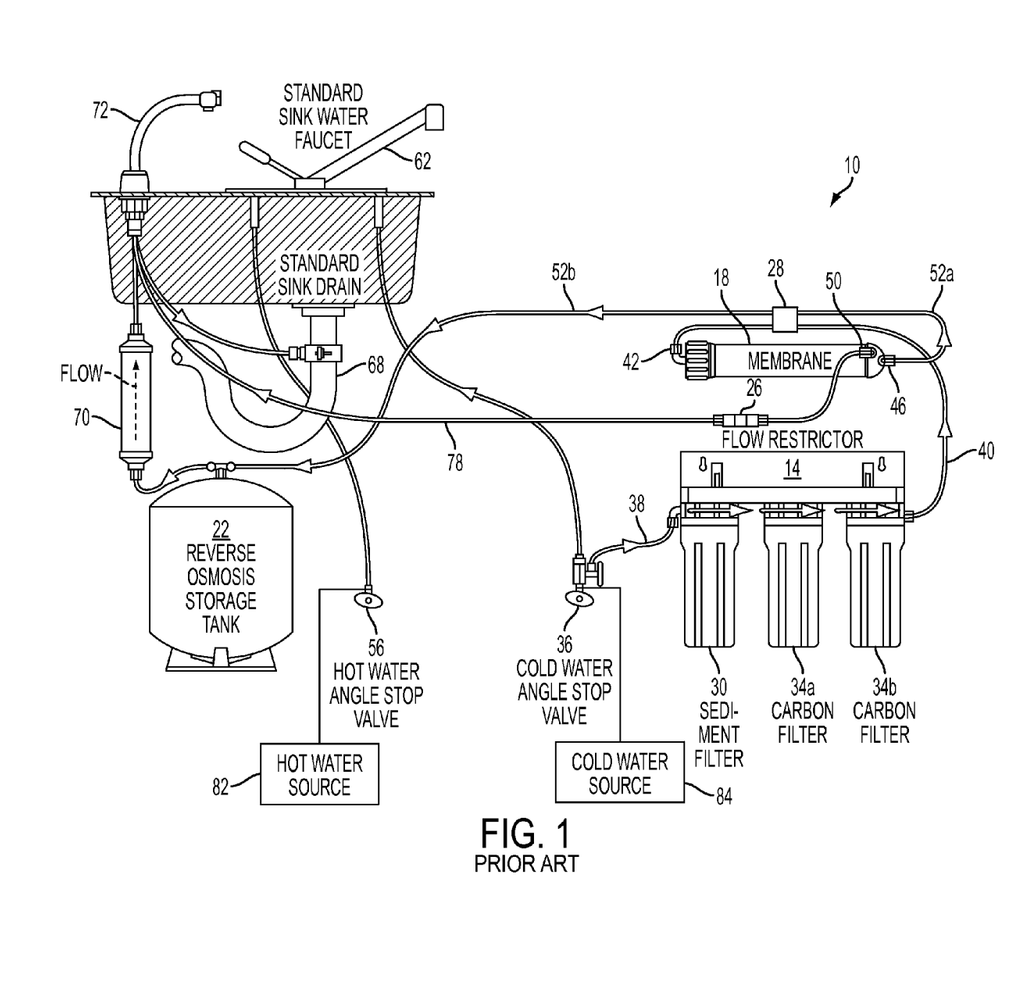
FIG. 1 is a diagrammatic plan view of an exemplary embodiment of a prior art reverse osmosis water filtering system, wherein concentrate water produced by the system is directed to a sink drain as waste.

FIG. 1 shows a typical reverse osmosis (RO) water filtering system 10 constructed in accordance with the prior art. The filtering system 10 is designed to work in parallel with a traditional system. The traditional system has a standard water faucet 62 fed by hot and cold water sources 82, 84 through angle stop valves 56, 36, respectively. The faucet 62 dispenses water above a standard sink drain 68 that can be shared with the system 10.

The system 10 includes a filter assembly 14, a reverse osmosis membrane 18, a reverse osmosis storage tank 22, a flow restrictor 26, a shut-off valve 28, a carbon filter 70 and an auxiliary faucet 72. The filter assembly 14 includes a sediment filter 30 and carbon filters 34a, 34b. Intake water enters the system 10 from a cold-water angle stop valve 36, which is connected to a cold-water source 84, and is routed through an intake tube 38 to filter assembly 14.

The sediment filter 30 removes sediment such as sand and dirt and the like from the intake water, while the carbon filters 34a and 34b remove chlorine and other contaminants that cause bad color, odor and taste. The filtered water is then routed to the membrane 18 through a water tube 40. The membrane 18 includes three ports: an intake port 42, a permeate outlet port 46, and a concentrate outlet port 50. The intake port 42 receives filtered intake water from the filter assembly 14 through the water tube 40. The permeate water is routed from outlet port 46 through permeate tubes 52a and 52b and shut-off valve 28 to tank 22 to be stored under pressure. The shut-off valve 28 is automatic and stops the flow of water to the membrane 18 and to the tank 22 when the tank is full. As a result, filtered water is not wasted by constantly flowing.

When the auxiliary faucet 72 is opened by a user, permeate water is forced from the tank 22, through a carbon filter 70, and though the faucet 72. Concentrate water is routed from the outlet port 50 through a wastewater tube 78 through a drain tube 74 for subsequent disposal down drain 68. Including a flow restrictor 26 in the wastewater tube 78 can reduce the flow of concentrate water to the drain 68.

Since water shortages are a problem in many arid and highly populated regions of the world, such as southern California, it is preferable that the concentrate water not be routed to the drain 68 in order to conserve water. Reverse osmosis systems that do not route the concentrate to the drain are referred to as "zero waste" reverse osmosis systems. For a common household reverse osmosis system, it has been suggested that the concentrate water can be discharged into the hot water line of the home for reuse instead of being routed to the drain. Because domestic hot water is not normally used for drinking, the presence of the concentrate water in the hot water line is acceptable.

Figure 2:
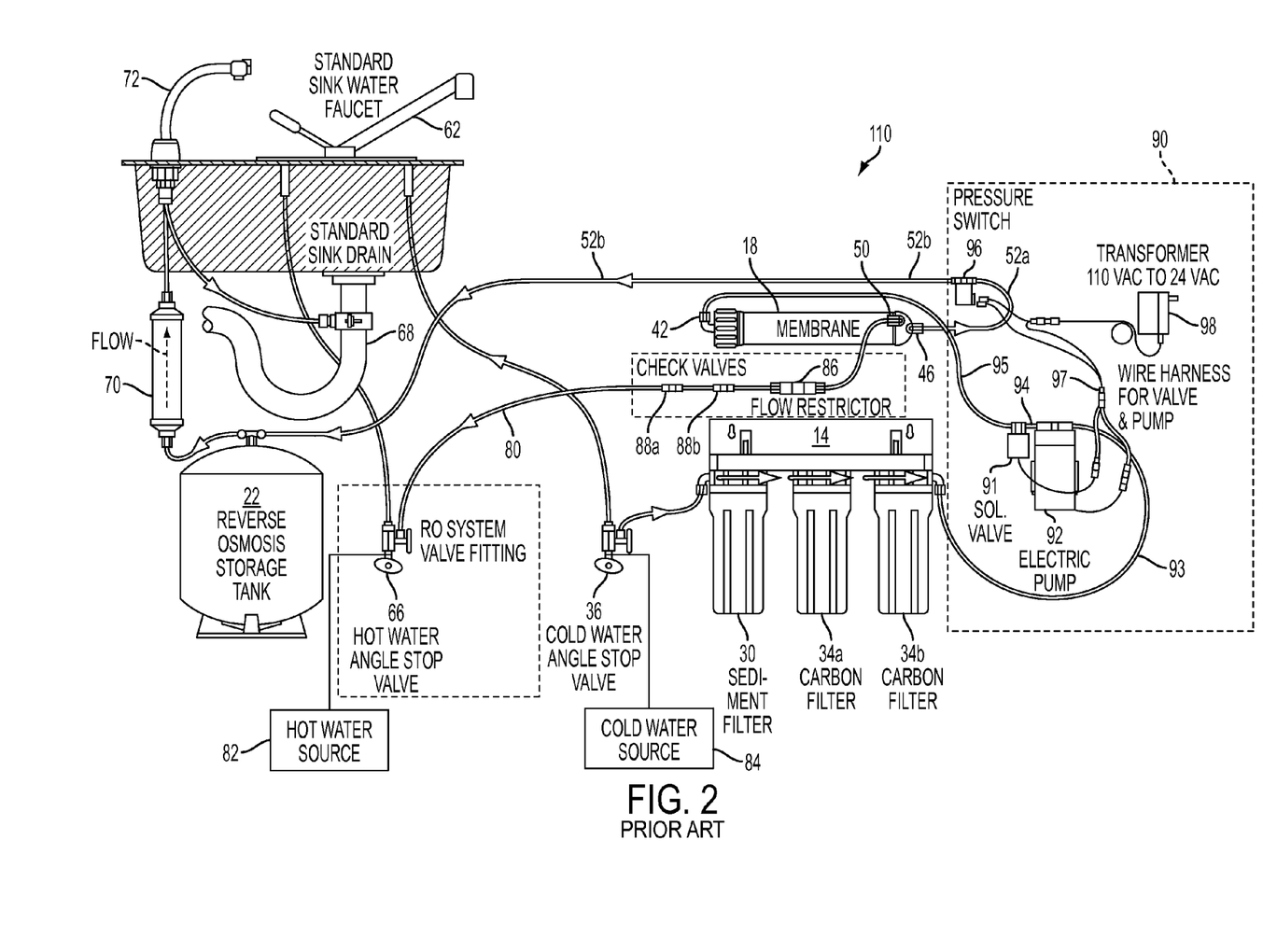
FIG. 2 is a diagrammatic plan view of an exemplary embodiment of a "zero waste" reverse osmosis water filtering system constructed in accordance with the prior art and including an electric valve-pump assembly that injects concentrate water produced by the system into a hot water source for reuse as part of the hot water source.

In view of the above, additional zero waste reverse osmosis systems have been developed such as shown in FIG. 2 and referred to generally by the reference numeral 110. The system 110 of FIG. 2 is similar to the system 10 of FIG. 1 such that similar elements have the same reference numerals. In the system 110, however, the concentrate water is routed to a valve on the hot water angle stop 66 through tube 80 that has a flow restrictor 86 and two check valves 88a, 88b. The flow restrictor 86 is a larger rated flow restrictor than flow restrictor 26 of FIG. 1 in order to offset the backpressure from hot water source. The check valves 88a and 88b prevent hot water from the hot water source 82 from entering membrane 18 due to any backpressure that may occur.

The system 110 also includes an electric valve-pump assembly 90 between the membrane 18 and the filtering system 14. The electric valve-pump assembly 90 includes a solenoid valve 91, an electric pump 92, a pump intake tube 93, a valve-pump tube 94 that allows water to flow between the pump 92 and the solenoid valve 91, a valve outlet tube 95, a pressure switch 96 that is electrically connected to the pump 92 and the solenoid valve 91 by a wire harness 97, and a transformer 98 that supplies power to the pump 92, the switch 96, and the valve 91.

The transformer 98 is connected to an electric wall outlet (not shown). The pump intake tube 93 connects the filtering system 14 to the pump 92. The valve outlet tube 95 connects the solenoid valve 91 to inlet port of the membrane 18. The pressure switch 96 is connected between the permeate tubes 52a and 52b.

In operation, the user opens reverse osmosis faucet 72 and the permeate water in the tank 22 is forced from the tank 22 by the pressure within the tank 22. As the tank 22 is being depleted of permeate water, the pressure switch 96 detects that the pressure within the tank 22 is below a predetermined pressure that corresponds to the tank 22 being filled. The pressure switch 96 then electrically opens the solenoid valve 91 and electrically engages the pump 92 to pump filtered water received from the filtering system 14 through the open solenoid valve 91 through the outlet valve tube 95 to the membrane 18.

The pump 92 continues pumping filtered water to the membrane 18 until the switch 96 detects that the pressure within tank 22 has reached a predetermined pressure, which corresponds to the tank 22 being full. The pump 92 also acts to provide enough system pressure to inject the concentrate water from the membrane 18 into the hot water line at 66. At the predetermined pressure, the switch 96 electrically disengages the pump 92 from pumping filtered water from the filter system 14 to the membrane 18 and closes solenoid valve 91.

In view of the systems above, additional systems have been developed. For example, see U.S. Published Patent Application No. 2007/0125710, published on Jun. 7, 2007, entitled "Non-electric zero waste reverse osmosis water filtering system." Additional systems are shown in U.S. Pat. No. 5,045,197, issued on Sep. 3, 1991, entitled "Reverse osmosis purification system with unitary header manifold" and International Patent Cooperation Treaty Patent Application No. WO 2004/069368, published on Aug. 19, 2004, entitled "One-piece manifold for a reverse osmosis system."

SUMMARY OF THE DISCLOSURE

There are problems associated with prior art RO filtering systems. For example, the system 110 of FIG. 2, requires a complicated arrangement including a solenoid valve and pressure switch to operate the pump. Such complexity adds to the cost and level of difficulty in assembling and maintaining the system 110. Further, as space is often a concern, these extra elements make the system 110 undesirably large and cumbersome.

It is an object of the subject technology to provide a new and improved shut-off valve. The shut-off valve can work with a variety of prior art RO filtering systems. Additionally, the shut-off valve may be configured to work with zero waste RO filtering systems.

In one embodiment, the subject technology is directed to a shut-off valve for use in a filtering system including a housing defining an interior in fluid communication with a water inlet, a water outlet, and a permeate inlet. The housing has a fluidic network with a flowpath that connects the water inlet and the water outlet. A diaphragm plate forms a portion of the fluidic network within the interior and a piston selectively opens and closes the flowpath. At least one diaphragm couples to the piston and the diaphragm plate such that as permeate pressure changes occur at the permeate outlet, the piston rocks between opening and closing the flowpath.

Preferably, the piston includes a projection intermediate opposing ends such that the projection contacts the diaphragm plate and, thereby, the piston pivots about an area of contact between the projection and the diaphragm plate. The housing may further define a permeate outlet in fluid communication with the permeate inlet such that a permeate flowpath is formed there between. In one embodiment, the at least one diaphragm is two rolling diaphragms. Still another embodiment includes a spring coupled to the piston to provide an opposing force to the permeate pressure.

Another embodiment of the subject technology is directed to a shut-off valve for use in a filtering system including a housing defining an interior with a fluidic network including a supply flowpath between a supply inlet and a supply outlet as well as a permeate inlet. A plate mounts within the interior and a piston rockingly couples to the plate for selectively opening and closing the supply flowpath. Movement of the piston between opening and closing the supply flowpath is based on pressure changes in the permeate inlet.

Still another embodiment of the subject technology is directed to a shut-off valve for use in a filtering system including a housing defining a pressure port and an interior in fluid communication with an inlet and an outlet. The housing has a flowpath between the inlet and the outlet. A valve member movably mounts within the interior for selectively opening and closing the flowpath based upon pressure changes at the pressure port. A magnet is attached to the valve member for movement therewith. A sensor attaches to the housing for generating a logic high and a logic low based on a position of the magnet such that the logic high and the logic low are provided to a pump when the flowpath is open and a closed, respectively. Preferably, the valve includes a plate within the interior, wherein the valve member is a piston coupled to the plate that rocks about a pivot point on the plate. In another embodiment, the valve member is a linear member that moves substantially linearly.

Still another embodiment of the subject technology is directed to a shut-off valve for use in a filtering system including a housing having an interior defining a supply flowpath between a supply inlet and a supply outlet as well as a permeate inlet. A piston within the interior has opposing ends. A diaphragm plate forms two tapered throughbores, each throughbore being tapered and receiving one of the opposing ends. A first diaphragm couples to the first piston end and the diaphragm plate and a second diaphragm couples to the second piston end and the diaphragm plate. As pressure changes occur in the permeate inlet, the piston moves between opening and closing the supply flowpath as a force on each opposing end varies dynamically due to the respective tapering. Preferably, the piston has a depending projection that engages a pivot point on the diaphragm plate for rotation about the pivot point, the pivot point being off-center with respect to the opposing ends. In one embodiment, one of the throughbores is more significantly tapered than the other throughbore and the diaphragms are rolling diaphragms of the same size.

Yet another embodiment of the subject technology is directed to a shut-off valve for use in a filtering system including a housing having an interior defining a supply flowpath between a supply inlet and a supply outlet as well as a permeate inlet. A valve member within the interior has first and second opposing ends. A manifold forms at least one tapered throughbore for receiving the first end. At least one diaphragm couples to the first end and the manifold such that as pressure changes occur in the permeate inlet, the valve member moves between opening and closing the supply flowpath as a force on the first end varies dynamically due to the tapering of the throughbore.

Still yet another embodiment of the subject technology is directed to a filtering system including a water supply, a filter assembly connected to the water supply to create a filtered water supply, a pump assembly connected to the filter assembly for selectively pumping the filtered water supply, and a shut-off valve connected to the pump assembly. The shut-off valve includes: i) a housing defining a pressure port and an interior having an in-line flowpath to the pumped filtered water supply outlet; ii) a valve member movably mounted within the interior for selectively opening and closing the flowpath based upon pressure changes at the pressure port; iii) a magnet attached to the valve member for movement therewith; and iv) a sensor attached to the housing for generating a control signal for the pump assembly such that the pump assembly is on when the flow path is open and off when the flowpath is closed. A reverse osmosis membrane connects to the shut-off valve for producing permeate from the pumped filtered water supply. The permeate is also connected to the pressure port. A tank connects to the reverse osmosis membrane for storing permeate produced thereby. A faucet connects to the storage tank for dispensing the permeate.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF DRAWINGS

Reference is made to the attached drawings, wherein elements having the same reference character designations represent like elements throughout.

DETAILED DESCRIPTION OF PREFERRED EMBODIMENTS

The present disclosure overcomes many of the prior art problems associated with shut-off valves for use in reverse osmosis filtering systems and like applications. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as left, right, up, and down are with reference to the Figures, and not meant in a limiting sense. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and can be altered without materially affecting or limiting the disclosed technology.

A Shut-off Valve

Figure 3:
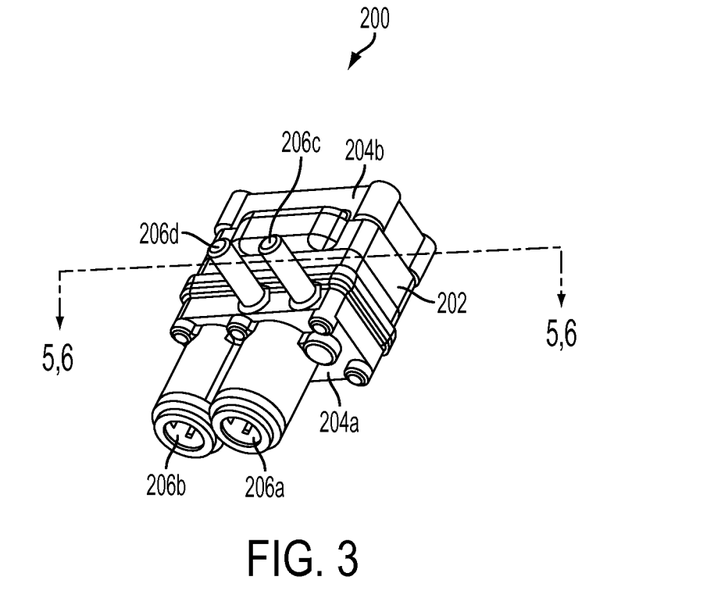
FIG. 3 is a perspective view of a shut-off valve in accordance with the subject disclosure for use in the reverse osmosis water filtering system of FIG. 1.

Referring to FIG. 3, a perspective view of a shut-off valve 200 in accordance with the subject disclosure for use in the reverse osmosis water filtering system of FIG. 1 is shown. The valve 200 has a housing 202 formed by two mating parts 204a, 204b. Housing part 204a defines two ports 206a, 206b connected in the fluid pathway from the filter assembly 14 to the membrane 18. The housing part 204a also defines two ports 206c, 206d in communication with the fluid pathway from the RO membrane to storage tank (e.g., in FIG. 2, the RO membrane 18 and storage tank 22). As a result, the valve 200 can selectively open and close the fluid pathway from the filter assembly 14 to the membrane based upon a pressure level within the fluid pathway from the membrane to the storage tank. In other words, when the permeate storage tank is substantially full, the valve 200 closes the inlet water flow to the RO membrane.

Figure 4:
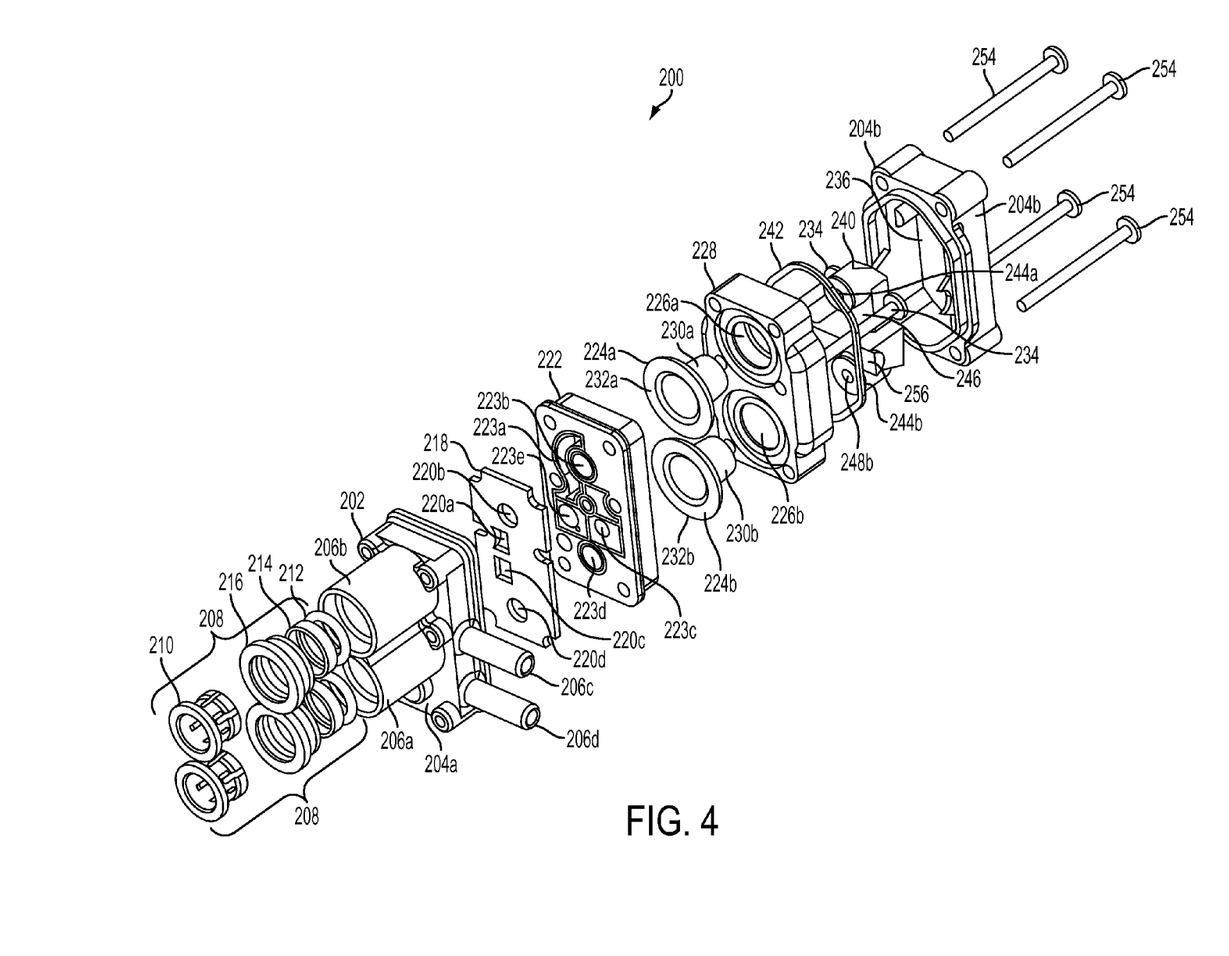
FIG. 4 is an exploded perspective view of the shut-off valve of FIG. 3.

Referring now to FIG. 4, an exploded perspective view of the shut-off valve 200 is shown. It is envisioned that housing 202 and many components therein would be a standard part but the housing 202 could be adapted, reconfigured, and rearranged for insertion in the plumbing of any reverse osmosis filtering system.

Figure 5:
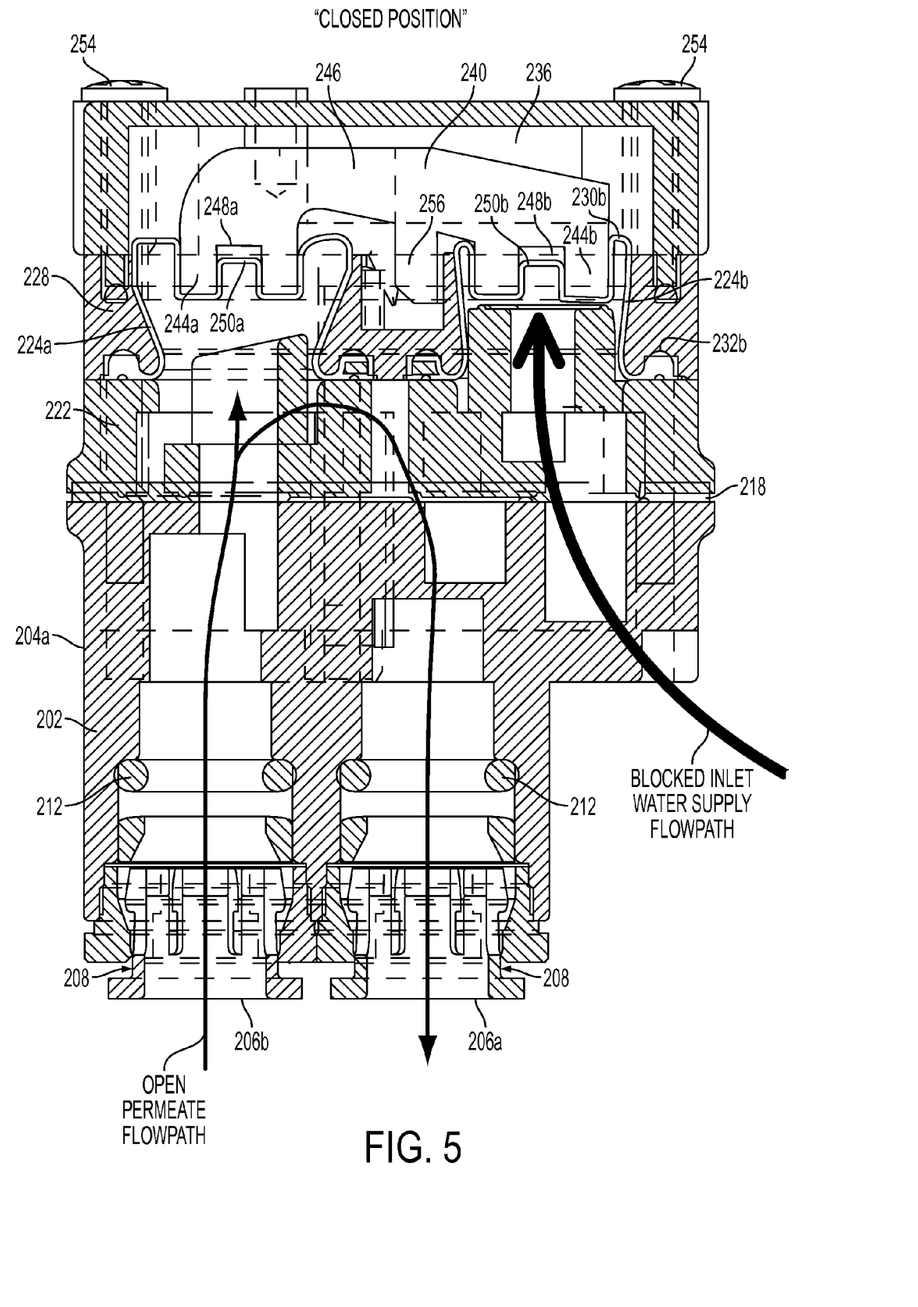
FIG. 5 is a first cross-sectional view of the shut-off valve of FIG. 3 with the shut-off valve closed to block inlet water to the membrane.

Referring additionally to FIG. 5, which shows a cross-sectional view of the valve 200, the two ports 206a, 206b retain collet assemblies 208 as is known within the art to provide fluid tight connection into the RO filtering system 10. The collet assemblies 208 include a collet 210 matched with an o-ring 212, guide ring 214, and cap 216 to fit within the respective port 206a, 206b.

A planar gasket 218 sealingly engages the housing part 204a and defines apertures 220a, 220b, 220c, 220d in fluid communication with the ports 206a, 206b, 206c, 206d, respectively. A spacer 222 mounts to the gasket 218 for further defining the network of passages or flowpaths throughout the housing 202 of the assembled valve 200. Two rolling diaphragms 224a, 224b couple to the spacer 222. The spacer 222 defines channels 223a-e for distributing the flowpaths into the diaphragms 224a, 224b so that the valve 200 closes the flowpath between the ports 206c, 206d when the permeate storage tank 22 is full.

The spacer 222 defines the channel 223b connected to aperture 220b for passing fluid into the diaphragm 224a. Upon return, such fluid reenters the spacer 222 via the channel 223a, which connects to aperture 220a to ultimately exit via port 206a. The spacer 222 also defines the channel 223d connected to aperture 220d for passing fluid into the diaphragm 224b. Upon return, such fluid reenters the spacer 222 via the channels 223c, 223e, each of which connects to the aperture 220c to ultimately exit via port 206c.

Still referring to FIGS. 4 and 5, each diaphragm 224a, 224b inserts into a throughbore 226a, 226b formed in a diaphragm plate 228. Although the diaphragms 226a, 226b are the same and, thus, interchangeable, the throughbores 226a, 226b vary as described below. The diaphragms 224a, 224b are cup-shaped flexible membranes 230a, 230b with annular flanges 232a, 232b. The flowpaths extend into the cup-shaped membranes 230a, 230b, which expand under pressure to conform to the throughbores 226a, 226b. The annular flanges 232a, 232b are captured to facilitate sealing between the diaphragm plate 228 and spacer 222 when the plate 228, spacer 222 and gasket 218 are retained to the housing part 204a by two screws 234.

Figure 6:
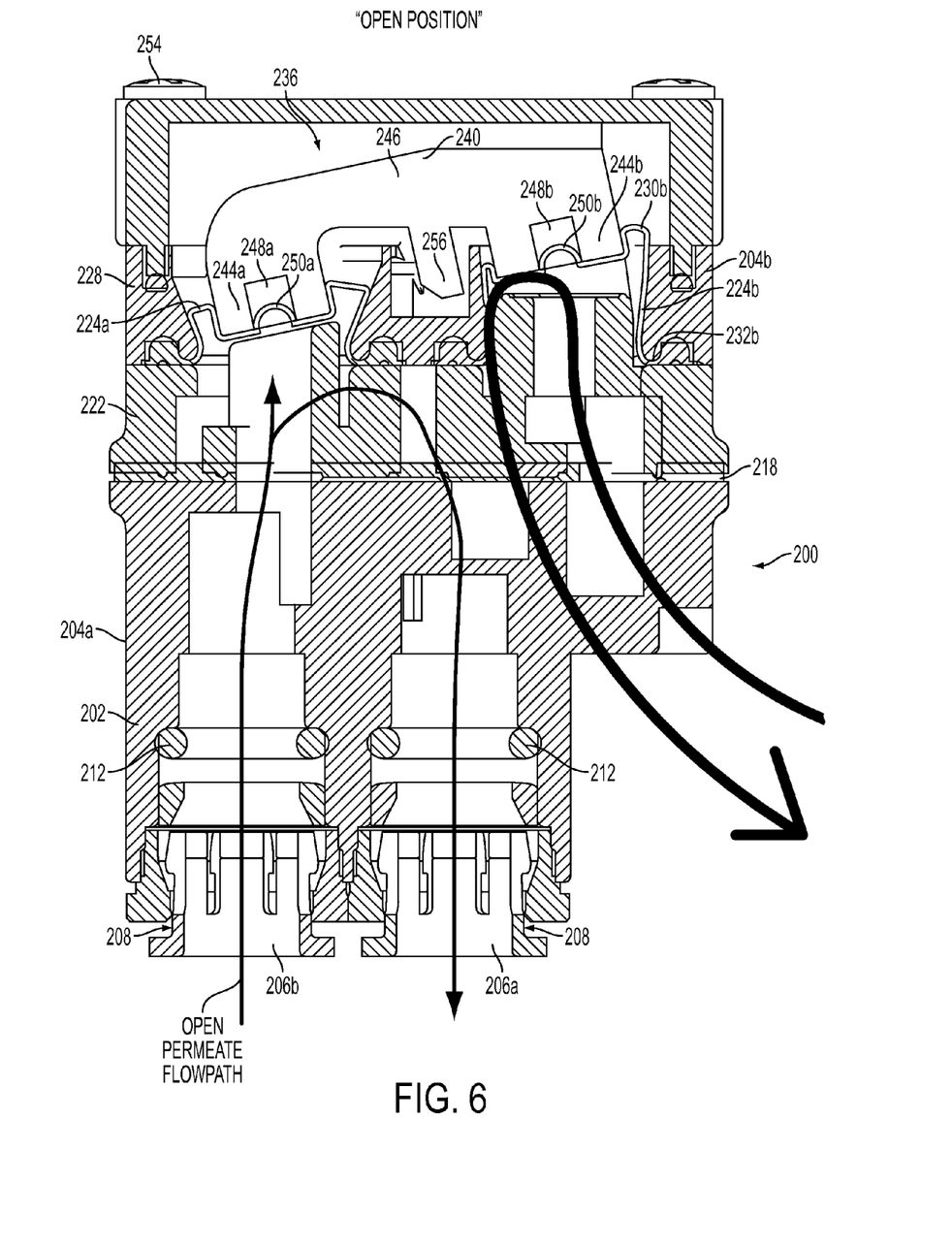
FIG. 6 is a second cross-sectional view of the shut-off valve of FIG. 3 with the shut-off valve open to allow inlet water to flow through the membrane.

Housing part 204b and the diaphragm plate 228 combine to define a chamber 236 that retains a piston 240. An o-ring 242 provides a sealing arrangement between the housing part 204b and diaphragm plate 228 with the diaphragms 224a, 224b providing additional sealing. Four screws 254 hold the housing parts 204a, 204b together. The piston 240 is movably mounted against the diaphragm plate 228 to rock between a closed position (see FIG. 5) and an open position (see FIG. 6). The piston 240 has opposing barrel shaped ends 244a, 244b with a central body portion 246 extending there between. Each barrel-shaped end 244a, 244b has a recess 248a, 248b for coupling a protrusion 250a, 250b (see FIG. 5) on the cup-shaped membranes 230a, 230b. When assembled, not only do the recesses 248a, 248b capture the respective protrusion, but the cup-shaped membranes 230a, 230b roll up onto the barrel-shaped ends 244a, 244b as shown in FIGS. 5 and 6.

The central body portion 246 of the piston 240 has a depending finger 256 that engages a pivot point (not explicitly shown) formed by the diaphragm plate 228. The piston 240 is held in position in relation to the diaphragm plate 228 by the diaphragms 224a, 224b. Pressure changes within the ports 206a, 206b act on the piston 240 through the rolling diaphragms 224a, 224b to move the piston 240 between the open and closed positions as described in further detail below. Preferably, the finger 256 (and associated pivot point) is offset from center to fine tune proper movement of the piston 240. In one embodiment, the depending finger 256 has a rounded tip that seats into a depression (not explicitly shown) in the diaphragm plate 228 to form the pivot point. As such, the piston 240 can rotate counterclockwise from the closed position shown in FIG. 5 to the open position shown in FIG. 6. In one embodiment, the amount of rotation from open to closed is approximately 12 degrees. In another embodiment, the pivot point is flat.

The throughbores 226a, 226b of the diaphragm plate 228 taper away from the piston 240. Thus, as the piston 240 rotates counterclockwise, the area of the membrane 224a surrounding the barrel-shaped end 244a decreases and the area of the membrane 224b surrounding barrel-shaped end 244b increases. Because force at a constant pressure is proportional to surface area, the counterclockwise movement of the piston 240 creates an upward force decrease against the rolling diaphragm 224a/barrel-shaped end 244a and an upward force increase on the rolling diaphragm 224b/barrel shaped end 244b. With these dynamic force changes, upon starting the counterclockwise or opening motion, the piston 240 reliably moves into the open position.

Similarly, when the piston 240 pivots clockwise to the closed position, the area of the membrane 224a surrounding the barrel-shaped end 244a increases and the area of the membrane 224b surrounding barrel-shaped end 244b decreases. As a result, the dynamically changing forces again create a downhill effect to reliably move the piston 240 into the desired closed position.

Regarding the movement between the open and closed positions, the valve 200 may be adapted to produce the desired performance for certain ranges of the supply pressure and permeate pressure. Typically, the inlet water supply pressure is larger than the permeate pressure in the storage tank. Several features of the valve 200 may be modified to fine tune performance.

For example, without being limited, the pivot point of the piston 240 may be moved towards or away from the barrel-shaped end 244b to lessen or increase the force required to open the valve 200. As shown in the Figures, the tapering within the throughbore 226a is more significant compared to the throughbore 226b in order to more significantly magnify the resulting force from movement changes therein. The size of the rolling diaphragms 224a, 224b/piston ends 244a, 244b may also be varied but it is noted that identical diaphragms 224a, 224b have the benefit of easier manufacturability.

By fine tuning the design, the valve 200 may be constructed with beneficial hysteresis. For example, it may be desirable to dispense a small amount of permeate, which results in a small pressure drop in the permeate storage tank 22, without having the valve 200 open. Some solutions would be to move the pivot point of the piston 240 to vary the mechanical advantage and/or modify the tapering of the throughbores 226a, 226b so that more than a small drop in the permeate pressure is required to open the valve 200. The valve 200 of FIGS. 4-6 is adapted and configured to require approximately a 30-50% drop in pressure before opening. Preferably, the required pressure drop is tuned to the incoming water pressure.

In Operation

Referring to FIG. 5, the valve 200 is shown in the closed position with flow arrows indicating the open permeate flowpath applying pressure to the rolling diaphragm 224a and the blocked inlet water supply flowpath applying pressure to the rolling diaphragm 224b. The pressure applied to the cup-shaped membranes 230a, 230b causes the membranes 230a, 230b to fill and contour to the throughbore 226a, 226b and roll around the piston ends 244a, 244b.

Under static conditions, the storage tank 22 would normally be full with the faucet 72 closed. As such, the shut-off valve 200 would normally be closed so that the membrane 18 would not be processing water. In other words, the permeate fluid pathway from the port 206b to port 206a would be open but the piston 240 would block the fluid pathway from the port 206d to port 206c. More specifically, the barrel-shaped end 244b of the piston 240 would seal against the diaphragm plate 228 to close the valve 200. In one embodiment, the diaphragm plate 228 has a post (not explicitly shown) with a sealing surface that the barrel-shaped end 244b contacts.

Upon opening the auxiliary faucet 72 to provide filtered water, the tank 22 begins to empty creating a drop in permeate pressure. The permeate pressure drop extends into the permeate flowpath in the valve 200 such that the pressure drops in the rolling diaphragm 224a. Initially, the balance of forces acting on the piston 240 changes but the piston 240 remains in the closed position because, among other things: i) the taper of the throughbores 226a, 226b creates relatively larger surface area in throughbore 226a; and ii) the off-center position of the finger 256/pivot point creates a mechanical advantage toward closing.

If enough permeate is dispensed, the reduced pressure applied to the barrel-shaped end 244a eventually is overcome by the inlet pressure acting on the opposing barrel-shaped end 244b. As a result, the piston 240 begins to move toward the open position, e.g., a counterclockwise rotation. If the auxiliary faucet 72 remains open, the permeate pressure continues to drop, which aids opening movement of the piston 240. Additionally, the piston's counterclockwise rotation dynamically reduces the surface area within throughbore 226a and dynamically increases the surface area within the throughbore 226b to result in dynamic force changes. Along with the mechanical advantage provided by the off-center pivot point, these force changes combine to effectively position the piston 240 in the fully open position of FIG. 6. Preferably, even if the auxiliary faucet 72 were closed once the piston 240 begins pivoting towards the open position, the opening would still be completed.

Referring to FIG. 6, the valve 200 is shown in the fully open position. Filtered water enters the valve inlet 206d and passes through the valve 200 as denoted by the flow arrow. The filtered water then passes through the membrane 18 to become a permeate feed and concentrate feed in a well known manner. The permeate feed passes into the valve port 206b and exits the valve port 206c for storage in the tank 22 or dispensing as the case may be.

Eventually, the auxiliary faucet 72 is closed. The tank 22 would typically only be partially full because the faucet 72 would dispense permeate much more quickly than the membrane 18 would generate permeate. Thus, the permeate pressure would be temporarily low and the fluid pathway between the ports 206d, 206c of the shut-off valve 200 would remain open in order to refill the tank 22 with permeate.

As the tank 22 refills with permeate, the pressure of the permeate rises and, in turn, the pressure between the valve ports 206a, 206b rises. When the tank 22 is full or substantially full as the case may be, the permeate pressure rises sufficiently to act on the barrel-shaped end 244a to pivot the piston 240 back into the closed position of FIG. 5. Again, once the closing movement begins, the effect of the tapered throughbores 226a, 226b creates a downhill effect to reliably fully close the valve 200. In one embodiment, the piston 240 pivots through at least 12 degrees between the open and closed positions.

Another Embodiment

Figure 7:
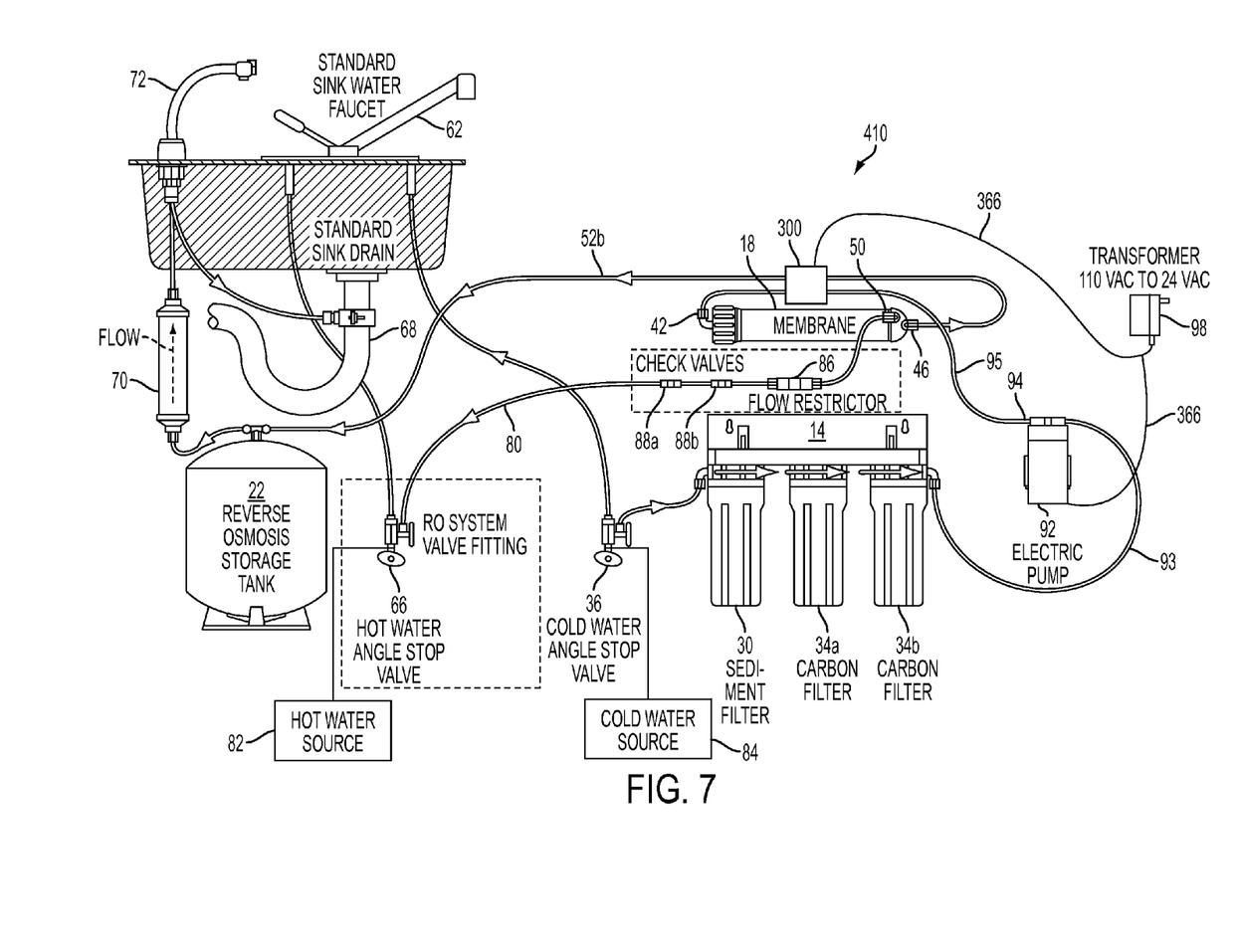
FIG. 7 is a diagrammatic plan view of an exemplary embodiment of a "zero waste" reverse osmosis water filtering system using a new and improved shut-off valve in accordance with the subject technology.
Figure 8:
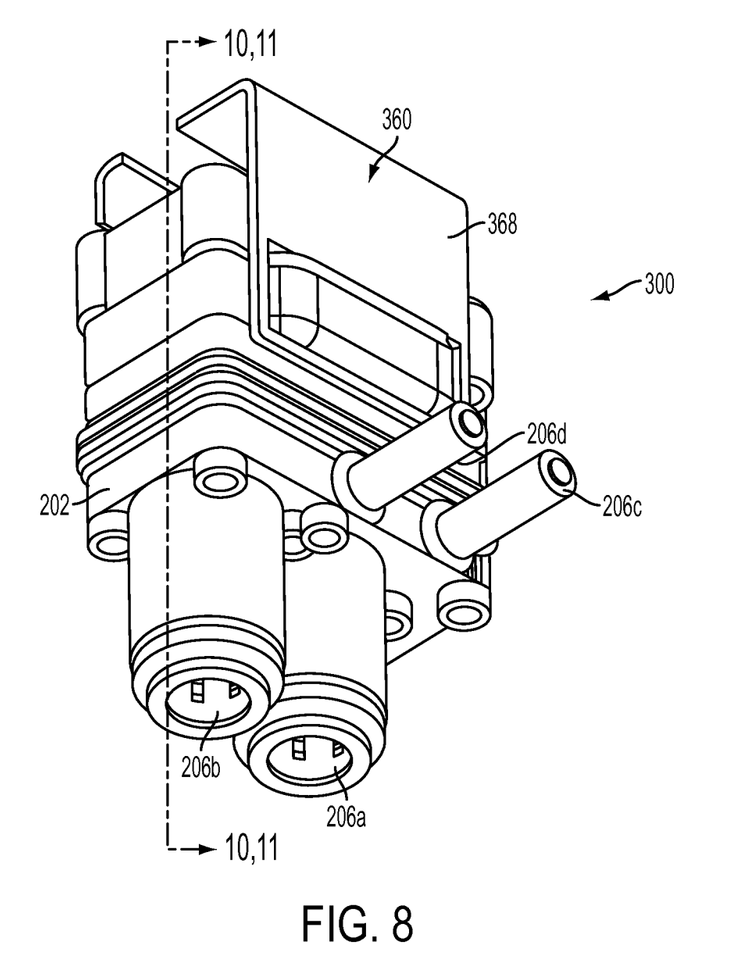
FIG. 8 is a perspective view of a shut-off valve in accordance with the subject disclosure for use in the reverse osmosis water filtering system of FIG. 7.
Figure 9:
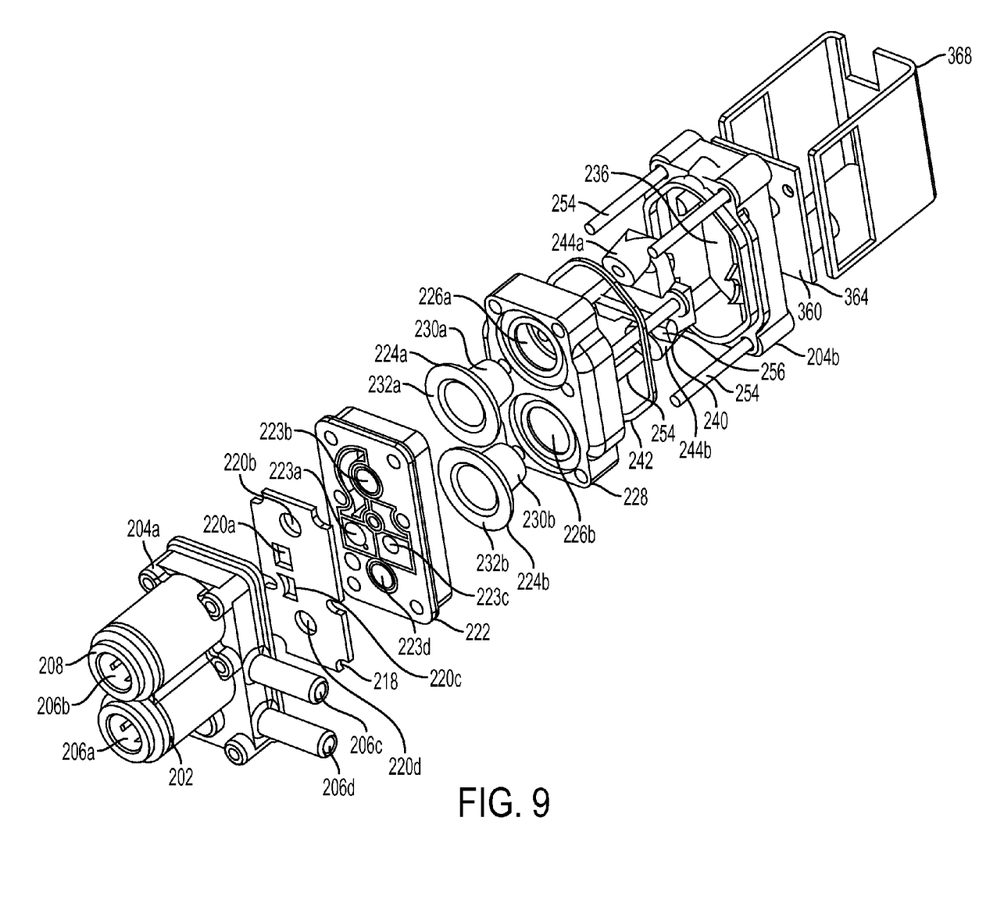
FIG. 9 is an exploded perspective view of the shut-off valve of FIG. 8.
Figure 10:
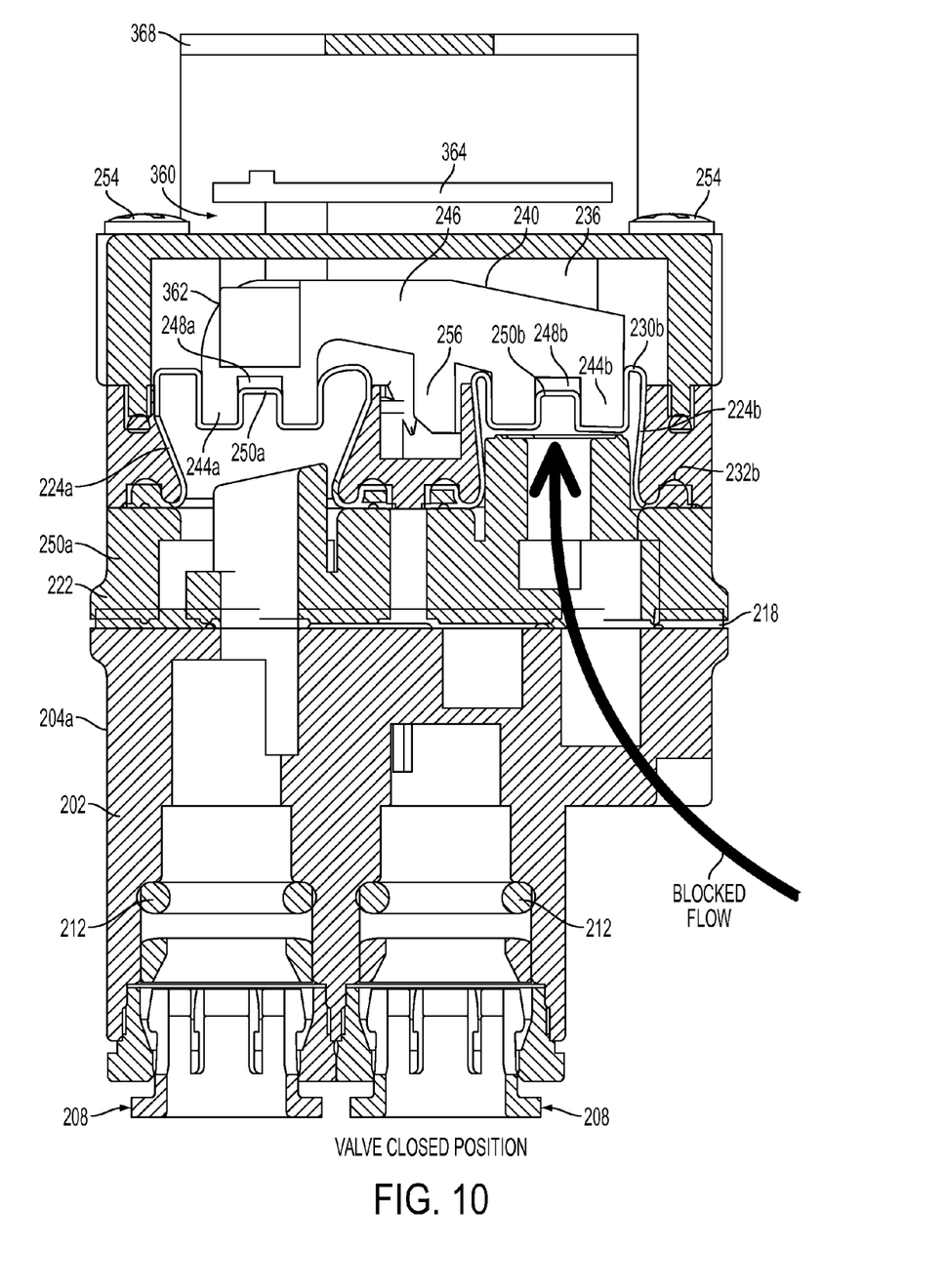
FIG. 10 is a first cross-sectional view of the shut-off valve of FIG. 8 with the shut-off valve closed to block inlet water to the membrane.
Figure 11:
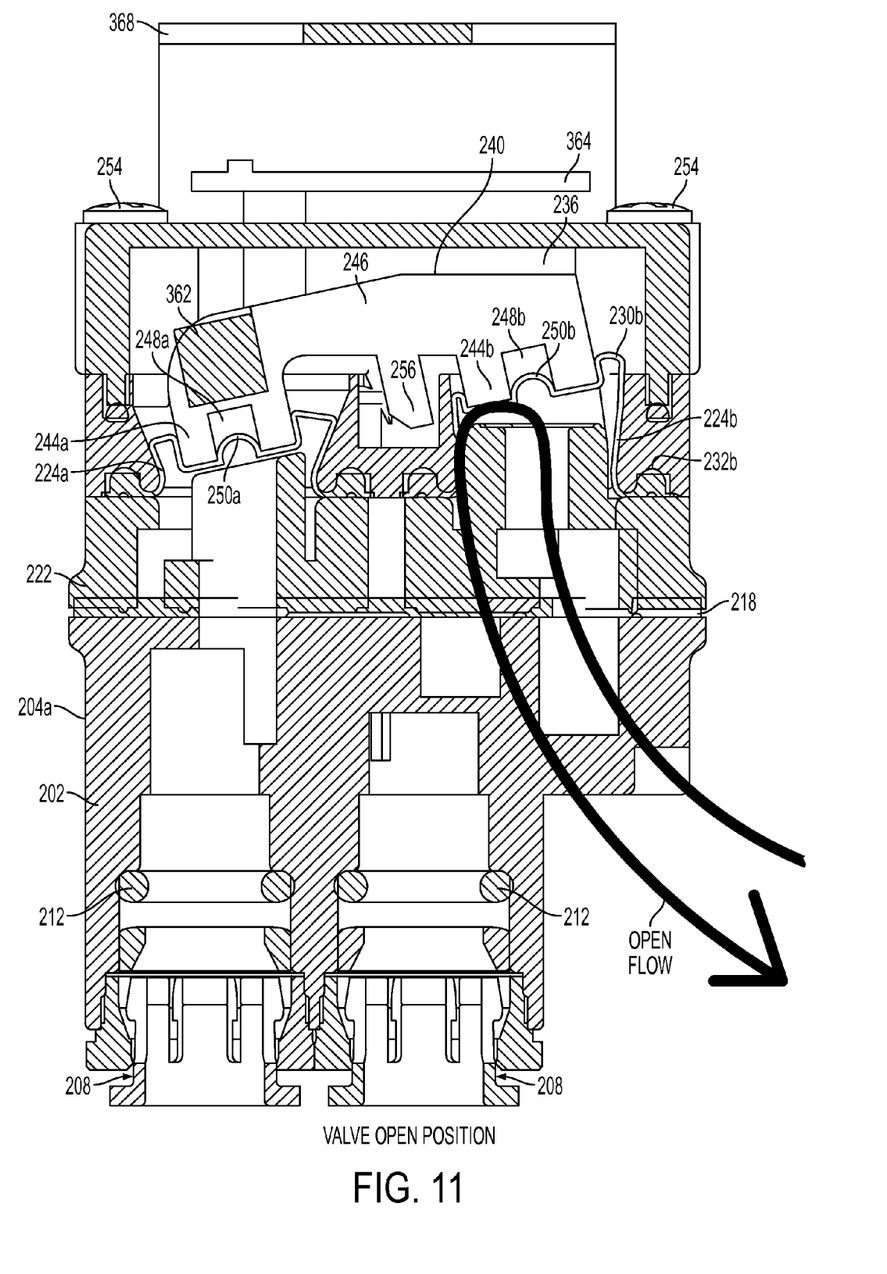
FIG. 11 is a second cross-sectional view of the shut-off valve of FIG. 8 with the shut-off valve open to allow inlet water to flow through the membrane.

Referring now to FIG. 7, a diagrammatic plan view of an exemplary embodiment of a "zero waste" reverse osmosis water filtering system 410 constructed with a new and improved valve 300 in accordance with the subject disclosure is shown. As can be seen by comparison to FIG. 2, the solenoid valve 91 and pressure switch 96 have been advantageously eliminated by the use of the valve 300. As will be appreciated by those of ordinary skill in the pertinent art, the shut-off valve 300 utilizes similar principles to the shut-off valve 200 described above. Accordingly, like reference numerals are used to indicate similar components and the associated description is not repeated.

Referring to FIGS. 8-11, perspective, exploded, open cross-sectional and closed cross-sectional views of the shut-off valve 300 are shown. The primary difference of the shut-off valve 300 in comparison to the shut-off valve 200 is the addition of a magnetic field sensor switch assembly 360 to selectively activate and deactivate the pump 92 based upon the setting of the shut-off valve 300. As a result, the solenoid valve 91 and pressure switch 96 are eliminated and the wiring harness is simplified. Further benefits associated with removal of the solenoid valve 91 and pressure switch 96 are improved reliability because each connection for these components creates additional potential leak points.

The hall effect or magnetic field sensor switch assembly 360 includes a magnet 362 mounted on the barrel-shaped end 244a of the piston 240 within the valve 300. Because the piston 240 is configured to rock, the movement of the barrel-shaped end 244a and, thereby, the magnet 362 is amplified to allow effective actuation of the hall effect switch assembly 360 during valve transitions. Although the magnet 362 may be attached to another point on the piston 240, such as the opposing barrel-shaped end 244b, positioning the magnet 362 farther from the pivot point creates a relatively larger movement of the magnet 362 during operation. In one embodiment, the movement of the magnet 362 is three times that of the opposing end 244b. In one embodiment, the magnet 362 is a short cylinder that is glued and/or press-fit into a bore in the barrel-shaped end 244a.

The switch assembly 360 also includes a printed circuit board (pcb) 364 mounted on the housing 202. Preferably, the pcb 364 is protected by a cover 368 that is also mounted to the housing 202. The pcb 364 is powered by the transformer 98 and wired to control the pump 92 via an electrical harness 366. The pcb 364 includes a sensor (not shown explicitly) that generates a logic high or low signal depending upon the position of the magnet 362. Thus, as the piston 240 and, in turn, the magnet 362 move between the open and closed positions, the output of the sensor varies. The pcb 364 processes the sensor output and controls the pump 92 accordingly. Thus, when the shut-off valve 300 is in the closed position of FIG. 10, the pump 92 is turned off. When the shut-off valve 300 is in the open position of FIG. 11, the pump 92 is turned on.

Preferably, no calibration to the magnetic field is required because the pcb 364 has a microprocessor that has been programmed to automatically adjust to any level of magnetic field. As long as the sensor can detect change in magnetic field, the switch assembly 360 will self-calibrate. Thus, the switch assembly 360 is easy to incorporate, less susceptible to manufacturing variation and allows the use of less expensive components.

In another embodiment, the subject technology incorporates a manual push-button to retain the shut-off valve in the closed position. The manual push-button would allow for removal and replacement of the RO membrane and like downstream components. In one embodiment, the manual push-button contacts the piston 240 adjacent the magnet 362. In still another embodiment, the manual push-button contacts the piston 240 on the barrel-shaped end 244b that opposes the end 244a having the magnet 362. In another embodiment, a single rolling diaphragm coupled to the end 244a is used to normally bias the piston into the closed position. As an opposing force, a biasing element such as a spring or similar element is coupled to the opposing end 244b or vice versa. In still another embodiment, the shut-off valve is only connected in-line with the inlet water, wherein the permeate line is simply provided to the shut-off valve to provide a source of pressure from the storage tank to actuate the piston. In still another embodiment, the shut-off valve does not include a rocking piston but rather uses a linearly actuating piston with various disclosed technology such as tapering at least one throughbore, utilizing the magnet to simplify design, and/or varying the size of the rolling diaphragms.

It is also envisioned that the subject technology be applied to existing reverse osmosis filtering systems as a retrofit or upgrade kit. One kit would upgrade a standard prior art system to include a booster pump. This first kit would include a replacement valve 300, a pump 92, and a transformer 98 to power the switch assembly 362 and pump 92 along with tubing and connectors as necessary. A second kit would further include two check valves 88a, 88b to upgrade to a zero waste RO filtering system. In another approach, the RO filtering systems are sold with a shut-off valve that includes a magnet mounted for movement with the valve member or piston that closes the inlet supply flowpath. Consequently, when upgrade is desired to a system with a booster pump, the upgrade kit would only need to include the pcb, transformer and pump. Similarly, additional check valves could make the system a zero waste system.

Incorporation by Reference

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A shut-off valve for use in a filtering system having a reverse osmosis filter supplying a permeate storage tank, the shut-off valve comprising:

a housing defining an interior in fluid communication with
a water inlet for connecting to a water supply, a water outlet for connecting to the reverse osmosis filter, a permeate inlet for connecting to the reverse osmosis filter, and a permeate outlet for connecting to the permeate storage tank, the housing having a fluidic network with a flowpath that connects the water inlet and the water outlet;

a diaphragm plate forming a portion of the fluidic network within the interior;

a piston within the interior for selectively opening and closing the flowpath, the piston having a central body portion extending between opposing first and second ends, wherein the piston is rigid and monolithically formed;

a first diaphragm coupling to the first end of the piston and the diaphragm plate; and a second diaphragm coupling to the second end of the piston and the diaphragm plate, wherein as permeate pressure changes occur at the permeate outlet, the piston automatically rotates and, thereby, the opposing first and second ends rotate to close the flowpath based on deflection of the first and second diaphragms in response to the permeate pressure change of the permeate storage tank being substantially full, and the piston automatically rotates to open the flowpath based on deflection of the first and second diaphragms in response to the permeate pressure change of the permeate storage tank dropping below a predetermined amount as an indication of being partially empty.

2. A shut-off valve as recited in claim 1, wherein the central body of the piston includes a depending projection intermediate the opposing first and second ends such that the projection contacts the diaphragm plate and, thereby, the piston pivots about an area of contact between the projection and the diaphragm plate.

3. A shut-off valve as recited in claim 2, wherein the diaphragm plate forms a cup-shaped depression for receiving the projection.

4. A shut-off valve as recited in claim 2, wherein the projection is closer to one of the opposing ends to fine tune movement of the piston.

5. A shut-off valve as recited in claim 1, wherein the housing further defines a permeate flowpath between the permeate outlet and the permeate inlet such that permeate in the flowpath acts on one of the diaphragms.

6. A shut-off valve as recited in claim 1, wherein the first and second diaphragms are two rolling diaphragms, each diaphragm having a resilient, flexible membrane portion that expands under pressure and a protrusion that couples into a recess formed on the respective end of the piston upon which the respective diaphragm rolls up onto.

7. A shut-off valve as recited in claim 1, further comprising a spring coupled to the piston to provide an opposing force to the permeate pressure.

8. A shut-off valve for use in a filtering system having a reverse osmosis filter, the shut-off valve comprising:

a housing defining an interior with a fluidic network defining a supply flowpath between a supply inlet and a supply outlet for providing supply water to the reverse osmosis filter as well as a permeate inlet connected to permeate from the reverse osmosis filter, and a permeate outlet connected to a permeate storage tank, the housing forming a permeate flowpath between the permeate inlet and the permeate outlet, the supply inlet adapted and configured to connect to a supply of the supply water;

a plate within the interior; and a piston rockingly coupled to the plate, the piston having a first end for selectively opening and closing the supply flowpath and a second end, wherein rotational movement of the first end of the piston between opening and closing the supply flowpath is based on a balance of pressure changes in the permeate inlet acting on the second end and a pressure of the supply acting on the first end so that when pressure drops below a predetermined amount in the permeate storage tank, a resulting pressure drop in the permeate flowpath causes the piston to automatically rotate so that the supply flowpath opens until pressure is restored in the permeate flowpath.

9. A shut-off valve as recited in claim 8, further comprising a magnet attached to the piston for movement therewith and a sensor attached to the housing for generating a logic high and a logic low based on a position of the magnet such that the logic high and the logic low are provided to a pump when the supply flowpath is open and closed, respectively.

10. A shut-off valve as recited in claim 8, wherein the plate forms two tapered throughbores, each throughbore being tapered and receiving one of the ends of the piston, and further comprising:

a first diaphragm coupling to the first piston end and the plate; and a second diaphragm coupling to the second piston end and the plate, wherein as pressure changes occur in the permeate inlet, the piston moves between opening and closing the supply flowpath as a force on each opposing end varies dynamically due to the respective tapering.

11. A shut-off valve as recited in claim 10, wherein at least one of the throughbores tapers away from the piston to create a force decrease against the respective diaphragm to enhance reliable motion of the piston.

12. A shut-off valve as recited in claim 10, wherein one of the throughbores is more tapered than the other throughbore to vary the balance of pressure changes.

13. A shut-off valve as recited in claim 10, wherein the diaphragms are rolling diaphragms of the same size.

14. A shut-off valve as recited in claim 8, wherein the piston has a depending projection that engages a pivot point on the plate for rotation about the pivot point, the pivot point being off-center with respect to the ends to mechanically bias the piston rotationally in one direction.

15. A filtering system comprising:
a) a water supply;
b) a filter assembly connected to the water supply to create a filtered water supply;
c) a pump assembly connected to the filter assembly for selectively pumping the filtered water supply;
d) a shut-off valve connected to the pump assembly, the shut-off valve including: i) a housing defining a pressure port and an interior having an in-line flowpath for the pumped filtered water supply; ii) a valve member movably mounted within the interior for selectively opening and closing the in-line flowpath based upon pressure changes at the pressure port; iii) a magnet attached to the valve member for movement therewith; and iv) a sensor attached to the housing for generating a control signal for the pump assembly such that the pump assembly is on when the in line flowpath is open and off when the in-line flowpath is closed;
e) a reverse osmosis membrane connected to the shut-off valve for producing permeate from the pumped filtered water supply, wherein the permeate is connected to the pressure port;
f) a storage tank connected to the reverse osmosis membrane for storing permeate produced thereby;

g) a faucet connected to the storage tank for dispensing the permeate;
h) a diaphragm plate forming a portion of a fluidic network within the interior;
i) a piston within the interior for selectively opening and closing the in-line flowpath, the piston coupled to the diaphragm plate at a pivot point for automatic rotation about the pivot point; and
j) at least one diaphragm coupling to the piston and the diaphragm plate such that as permeate pressure changes occur at the pressure port, the piston automatically rocks to rotate about the pivot point between opening and closing the in-line flowpath based on deflection of the at least one diaphragm in response to permeate pressure changes.

16. A shut-off valve as recited in claim 1, wherein the predetermined amount of permeate storage tank pressure drop is 30% below substantially full.

17. A shut-off valve as recited in claim 8, further comprising a spacer coupled to the plate and opposing the piston, the spacer having a first banking surface for the first end of the piston to close the supply flowpath and a second banking surface for the second end of the piston, wherein the banking surfaces are angled with respect to each other.

* * * * *